United States Patent
Haverinen et al.

(10) Patent No.: US 9,674,672 B1
(45) Date of Patent: Jun. 6, 2017

(54) POSITIONING MANAGEMENT

(71) Applicant: INDOORATLAS OY, Oulu (FI)

(72) Inventors: Janne Haverinen, Kiviniemi (FI); Esa Rahtu, Oulu (FI)

(73) Assignee: INDOORATLAS OY, Oulu (FI)

( * ) Notice: Subject to any disclaimer, the term of this patent is extended or adjusted under 35 U.S.C. 154(b) by 1 day.

(21) Appl. No.: 14/978,148

(22) Filed: Dec. 22, 2015

(51) Int. Cl.
*H04W 4/04* (2009.01)
*G01S 5/02* (2010.01)
*H04W 4/00* (2009.01)
*H04W 84/12* (2009.01)

(52) U.S. Cl.
CPC ........... *H04W 4/043* (2013.01); *G01S 5/0252* (2013.01); *H04W 4/008* (2013.01); *H04W 84/12* (2013.01)

(58) Field of Classification Search
CPC ..... H04W 4/043; H04W 4/008; H04W 84/12; G01S 5/0252
See application file for complete search history.

(56) References Cited

U.S. PATENT DOCUMENTS

| 8,798,924 B2 | 8/2014 | Haverinen |
| 9,078,104 B2 | 7/2015 | Haverinen |
| 9,080,874 B2 | 7/2015 | Haverinen |
| 2008/0191935 A1* | 8/2008 | Tidwell ............... G01S 19/20 342/357.58 |
| 2014/0179338 A1* | 6/2014 | Shang ............... H04W 4/023 455/456.1 |
| 2015/0118985 A1* | 4/2015 | Lawrence ............. H04B 17/27 455/226.2 |

OTHER PUBLICATIONS

U.S. Appl. No. 14/299,582, filed Jun. 9, 2014 in the name of Haverinen et al.
U.S. Appl. No. 14/725,452, filed May 29, 2015 in the name of Haverinen et al.
U.S. Appl. No. 14/725,521, filed May 29, 2015 in the name of Haverinen et al.
U.S. Appl. No. 13/859,944, filed Apr. 10, 2013 in the name of Haverinen et al.
U.S. Appl. No. 14/606,358, filed Jan. 27, 2015 in the name of Haverinen et al.
U.S. Appl. No. 13/739,640, filed Jan. 11, 2013 in the name of Haverinen et al.

(Continued)

*Primary Examiner* — Brandon Miller
(74) *Attorney, Agent, or Firm* — Oliff PLC

(57) ABSTRACT

A positioning management apparatus receives first reception information from a first mobile apparatus, the first reception information having been generated based on a received radio transmission from a transmitting apparatus, and receives second reception information from a second mobile apparatus, the second reception information having been generated based on a received radio transmission from a transmitting apparatus. The apparatus compares the first reception information with the second reception information, and, if the comparison indicates that both the first mobile apparatus and the second mobile apparatus received the radio transmission from the same transmitting apparatus, determines an association of the first mobile apparatus with the second mobile apparatus for use in positioning.

20 Claims, 9 Drawing Sheets

(56) References Cited

OTHER PUBLICATIONS

U.S. Appl. No. 13/871,612, filed Apr. 26, 2013 in the name of Perttunen et al.
U.S. Appl. No. 13/905,655, filed May 30, 2013 in the name of Haverinen et al.
U.S. Appl. No. 13/915,016, filed Jun. 11, 2013 in the name of Haverinen et al.
U.S. Appl. No. 14/054,264, filed Oct. 15, 2013 in the name of Haverinen et al.
U.S. Appl. No. 14/093,250, filed Nov. 29, 2013 in the name of Haverinen et al.
U.S. Appl. No. 14/207,916, filed Mar. 13, 2014 in the name of Rantalankila et al.
U.S. Appl. No. 14/524,420, filed Oct. 27, 2014 in the name of Haverinen et al.
U.S. Appl. No. 14/626,217, filed Feb. 19, 2015 in the name of Haverinen et al.
U.S. Appl. No. 14/859,985, filed Sep. 21, 2015 in the name of Haverinen et al.

* cited by examiner

POSITIONING MANAGEMENT

FIELD

The invention relates to a positioning management apparatus, a non-transitory computer-readable storage medium comprising a computer program, and a method in a positioning management apparatus.

BACKGROUND

Positioning has been emerging into the market. However, further refinement is desirable for smooth operation of the positioning.

BRIEF DESCRIPTION

The present invention seeks to provide an improved positioning management apparatus, an improved computer program, and an improved method.

According to an aspect of the present invention, there is provided a positioning management apparatus comprising: one or more processors; and one or more memories including computer program code, the one or more memories and the computer program code configured to, with the one or more processors, cause the positioning management apparatus at least to: receive first reception information from a first mobile apparatus, the first reception information having been generated based on a received radio transmission from a transmitting apparatus; receive second reception information from a second mobile apparatus, the second reception information having been generated based on a received radio transmission from a transmitting apparatus; and compare the first reception information with the second reception information, and, if the comparison indicates that both the first mobile apparatus and the second mobile apparatus received the radio transmission from the same transmitting apparatus, determine an association of the first mobile apparatus with the second mobile apparatus for use in positioning.

According to another aspect of the present invention, there is provided a non-transitory computer-readable storage medium comprising a computer program comprising computer program code which, when loaded into a positioning management apparatus causes the positioning management apparatus at least to: receive first reception information from a first mobile apparatus, the first reception information having been generated based on a received radio transmission from a transmitting apparatus; receive second reception information from a second mobile apparatus, the second reception information having been generated based on a received radio transmission from a transmitting apparatus; and compare the first reception information with the second reception information, and, if the comparison indicates that both the first mobile apparatus and the second mobile apparatus received the radio transmission from the same transmitting apparatus, determine an association of the first mobile apparatus with the second mobile apparatus for use in positioning.

According to another aspect of the present invention, there is provided a method in a positioning management apparatus comprising: receiving first reception information from a first mobile apparatus, the first reception information having been generated based on a received radio transmission from a transmitting apparatus; receiving second reception information from a second mobile apparatus, the second reception information having been generated based on a received radio transmission from a transmitting apparatus; and comparing the first reception information with the second reception information, and, if the comparison indicates that both the first mobile apparatus and the second mobile apparatus received the radio transmission from the same transmitting apparatus, determining an association of the first mobile apparatus with the second mobile apparatus for use in positioning.

LIST OF DRAWINGS

Example embodiments of the present invention are described below, by way of example only, with reference to the accompanying drawings, in which FIG. 1 illustrates example embodiments of a positioning management apparatus and its general operating environment;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the mobile apparatuses have been depicted as separate single entities, different parts may be implemented in one or more physical or logical entities.

Figure 1:
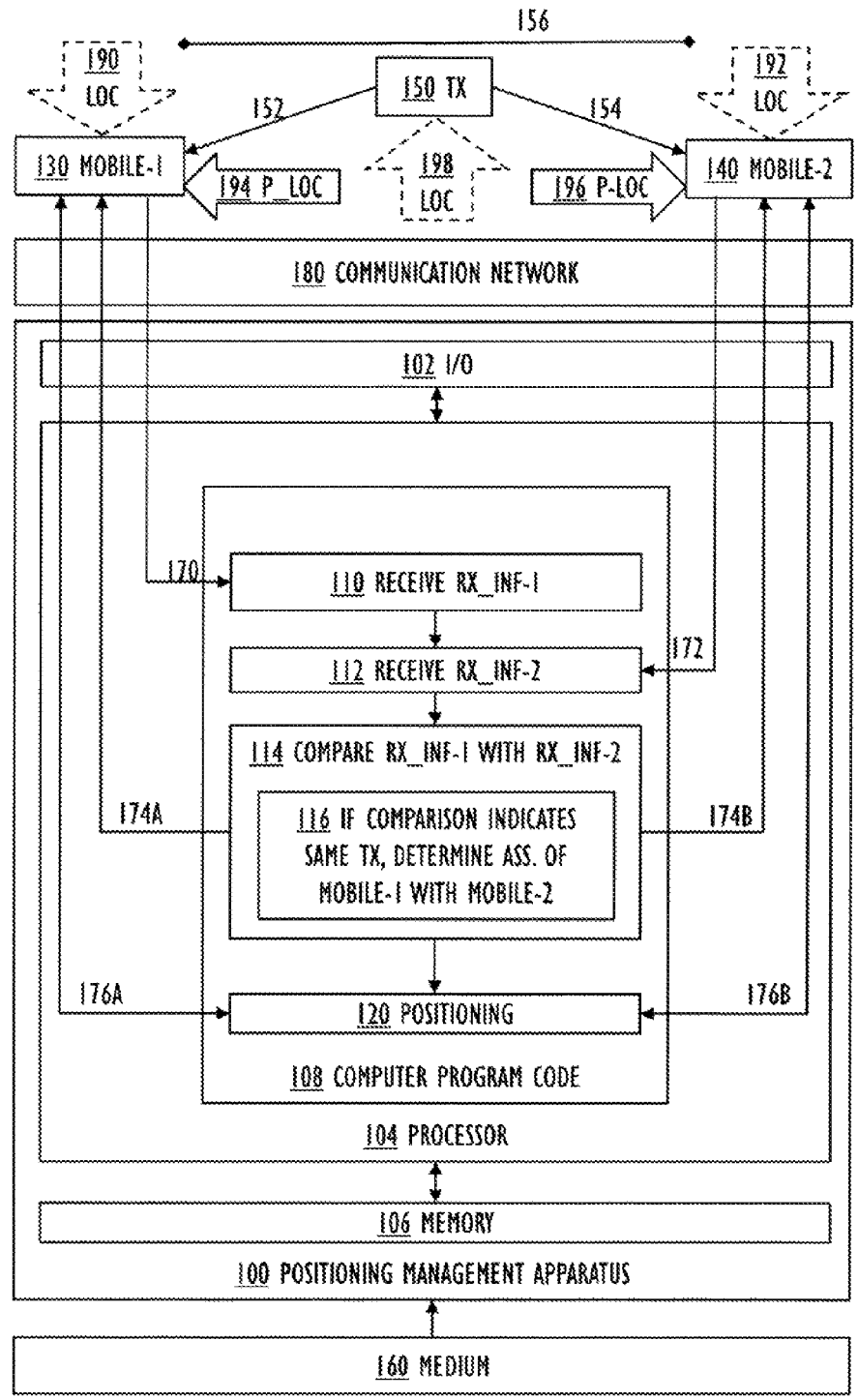

FIG. 1 illustrates example embodiments of a positioning management apparatus 100 and its general operating environment including a first mobile apparatus 130, a second mobile apparatus 140, and a transmitting apparatus 150.

The Applicant, IndoorAtlas, has developed many improvements for the magnetic positioning, disclosed in its various patents/applications, incorporated herein by reference: U.S. Pat. No. 8,798,924, U.S. Pat. No. 9,078,104, U.S. Pat. No. 9,080,874, Ser. No. 14/299,582, Ser. No. 14/725,452, Ser. No. 14/725,521 Ser. No. 13/859,944, Ser. No. 14/606,358, Ser. No. 13/739,640, Ser. No. 13/871,612, Ser. No. 13/905,655, Ser. No. 13/915,016, Ser. No. 14/054,264, Ser. No. 14/093,250, Ser. No. 14/207,916, Ser. No. 14/524,420, Ser. No. 14/626,217, and Ser. No. 14/859,985.

The positioning management apparatus 100 may comprise an input/output 102 (such as a data communication interface, for example a network interface card) to communicate with mobile apparatuses 130, 140 through a communication network 180.

In an example embodiment, the positioning management apparatus 100 may be implemented by a suitable computing resource or a combination of various computing resources.

In an example embodiment, the positioning management apparatus 100 may be implemented as a single server computer or as a cluster of computers. The server is a part of the client-server computing model that acts as distributed application which partitions tasks or workloads between the provider of a resource or service, called server, and the service requester, called client. The server 100 may serve a number of mobile apparatuses 130, 140. The server computer 100 may be a host that is running one or more server programs which share their resources with clients 130, 140. The client 130, 140 may request a service function relating to the magnetic positioning from the server 100. Also, the client 130, 140 may initiate a communication session with the server 100 which awaits incoming requests.

In an example embodiment, the positioning management apparatus 100 may also operate according to the cloud computing model, at least in part. Naturally, besides these example embodiments of the positioning management apparatus 100, other feasible computing architectures may be utilized as well to implement the hardware and software of the positioning management apparatus 100. Consequently, besides operating according to the client/server architecture, push technology may be utilized as well. In push technology, the request for a transaction is initiated by the positioning management apparatus 100, whereas with the pull technology the request for the information is initiated by the client 130, 140.

Figure 2:
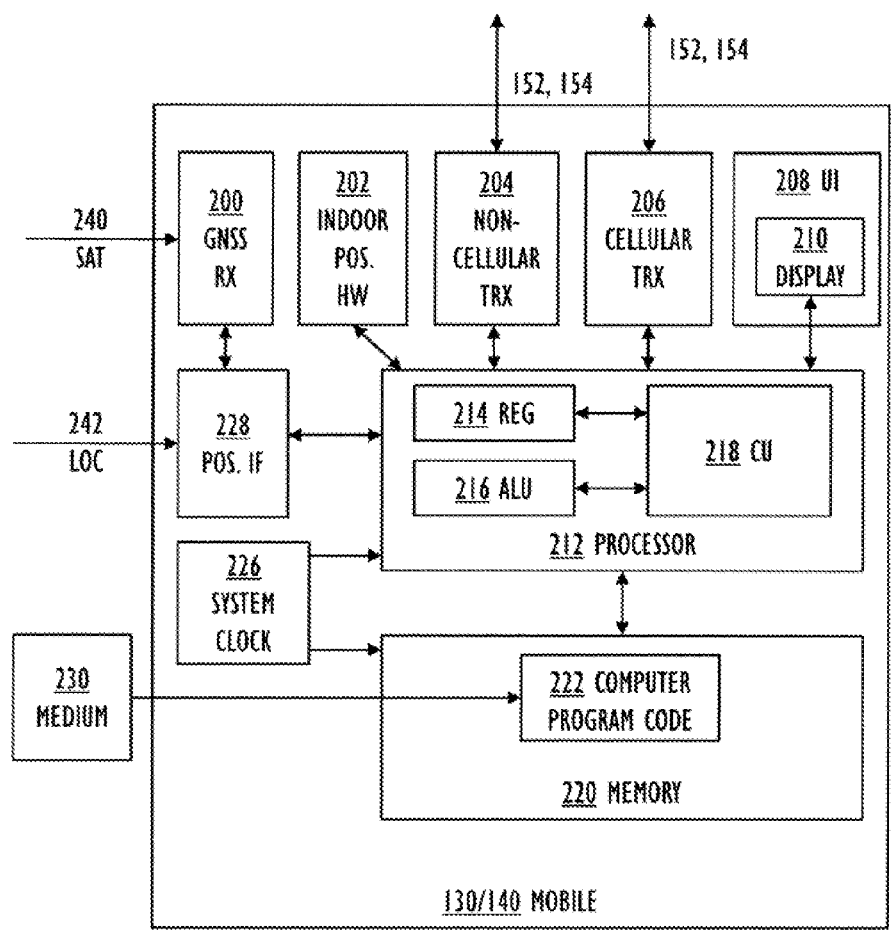
FIG. 2 illustrates example embodiments of a mobile apparatus.

In an example embodiment, the mobile apparatus 130, 140 is a portable electronic communication apparatus. A non-exhaustive list of the types of the mobile apparatus 130, 140 includes: a mobile phone, a smartphone, a tablet computer, a phablet, a smartwatch, a general-purpose mobile computing device. In an example embodiment, the mobile apparatus 130, 140 is a general-purpose off-the-shelf computing device, as opposed to a purpose-build proprietary equipment, whereby research & development costs will be lower as only the special-purpose software (and not the hardware) needs to be designed, implemented and tested. In FIG. 2, an example embodiment of the mobile apparatus 130, 140 is illustrated: the mobile apparatus 130, 140 is a smartphone or a tablet employing a display 210. Such devices may employ a suitable operating system such as iOS, Android, or Windows Phone, for example.

In an example embodiment, the transmitting apparatus 150 comprises at least one of a wireless local area network base station, an indoor base station, an access point, a wireless hot-spot, all of which may provide Internet access through the use of a router connected to a link to an Internet service provider. In an example embodiment, the transmitting apparatus 150 is stationary, fixed to a specific location. In another example embodiment, the transmitting apparatus 150 is mobile, capable to move around.

FIG. 2 illustrates further example embodiments of the mobile apparatus 130, 140. The mobile apparatus 100 comprises the display 210, one or more processors 212, and one or more memories 220 including computer program code 222.

In an example embodiment, the display 210 is implemented by an appropriate technology, such as a liquid crystal display (LCD), a thin-film transistor (TFT) display, a light-emitting diode (LED) display, an organic LED (OLED) display, an electroluminescent display (ELD), or an electronic paper (or e-paper or electronic ink) display, for example. The display 210 may also incorporate other user interaction means, such as touch input, or haptic feedback, i.e. the display may be a multi-touch display 210.

In an example embodiment, the display 210 is a part of the user interface 208 implementing the exchange of graphical, textual and auditory information with a user. The user interface 208 may be realized with various techniques, such as the display 210, means for producing sound, a keyboard, and/or a keypad, for example. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 208 may comprise other user interface components, for example various means for focusing a cursor (mouse, track ball, arrow keys, touch sensitive area etc.) or elements enabling audio control.

In an example embodiment, the mobile apparatus 130, 140 further comprises a positioning interface 228 configured to obtain an own location of the mobile apparatus 130, 140. As illustrated in FIG. 2, the positioning interface 228 may obtain the location data 240, 242 from various sources.

In an example embodiment, the mobile apparatus 130, 140 comprises a GNSS receiver 200, which generates the location data on the basis of signals 240 received from Earth-orbiting satellites. The GNSS may be GPS (Global Positioning System) of the USA, Galileo of the European Union, GLONASS of Russia, Beidou of China, or IRNSS of India, for example. Besides GNSS, or instead of GNSS, other location techniques may be utilizes as well such as those developed for use in cellular radio networks, and, consequently, the location data 242 may be obtained from the cellular radio network.

In an example embodiment, the mobile apparatus 130, 140 comprises indoor positioning hardware (and software) 202, which generates the location data. The indoor positioning hardware 202 may comprise a magnetometer to measure variations in the magnetic field of the Earth caused by building structures (especially by steel-reinforced concrete). Furthermore, in some cases, the indoor positioning hardware 202 may comprise an acceleration sensor (measuring in one, two or three dimensions) and/or a gyroscope, for example. It is to be noted that the magnetic positioning hardware 202 and software 222 co-operate with the positioning management apparatus 100 in order to implement the positioning.

In an example embodiment, the mobile apparatus 130, 140 comprises a cellular radio transceiver 206 and/or a non-cellular radio transceiver 204. The positioning interface 228 may obtain the location data as obtained/generated on the basis of the wireless communication utilizing the transceivers 204 and/or 206.

In an example embodiment, the cellular radio transceiver 206 may be interoperable with the already-mentioned various wireless standard/non-standard/proprietary cellular communication networks 180 such as any mobile phone network.

In an example embodiment, the non-cellular radio transceiver 204 may utilize a short-range radio transceiver such as a Bluetooth, Bluetooth low energy (BLE), Wi-Fi (or WiFi) or other WLAN transceiver (based on IEEE (Institute of Electrical and Electronics Engineers) 802.11 standard or its evolution versions (IEEE 802.11ac etc.), for example).

The positioning interface 228 may also obtain the location data with some other means. In an example embodiment, the mobile apparatus 130, 140 may comprise a radio frequency identification (RFID) reader configured to read the location data from an RFID tag attached fixedly to a known location. In an example embodiment, the mobile apparatus 130, 140 comprises a camera, and the location data may be obtained by photographing a machine readable code (such as a barcode or a QR code) attached fixedly to a known location or by photographing or recording video (from a floor, walls and/or ceiling) and identifying the location from identified unique features.

The term 'processor' 212 refers to a device that is capable of processing data. Depending on the processing power needed, the mobile apparatus 130, 140 may comprise several processors 212 such as parallel processors or a multicore processor. When designing the implementation of the processor 212, a person skilled in the art will consider the requirements set for the size and power consumption of the mobile apparatus 130,140, the necessary processing capacity, production costs, and production volumes, for example. The processor 212 and the memory 220 may be implemented by an electronic circuitry.

The term 'memory' 220 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, a system clock 226 constantly generates a stream of electrical pulses, which cause the various transferring operations within the mobile apparatus 130, 140 to take place in an orderly manner and with specific timing.

In an example embodiment, the processor 212 may be implemented as a microprocessor implementing functions of a central processing unit (CPU) on an integrated circuit. The CPU is a logic machine executing a computer program code 222. The computer program code 222 may be coded as a computer program using a programming language, which may be a high-level programming language, such as C, C++, or Java, or a low-level programming language, such as a machine language, or an assembler, for example. The CPU may comprise a set of registers 214, an arithmetic logic unit (ALU) 216, and a control unit (CU) 218. The control unit 218 is controlled by a sequence of the computer program code 222 transferred to the CPU from the (working) memory 220. The control unit 218 may contain a number of microinstructions for basic operations. The implementation of the microinstructions may vary, depending on the CPU design. The microprocessor 212 may also have an operating system (a dedicated operating system of an embedded system, a real-time operating system, or even a general-purpose operating system), which may provide the computer program code 222 with system services.

A non-exhaustive list of implementation techniques for the processor 212 and the memory 220 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 222 may be implemented by software and/or hardware. In an example embodiment, the software may be written by a suitable programming language, and the resulting executable code 222 may be stored on the memory 220 and run by the processor 212.

In an example embodiment, the functionality of the hardware may be designed by a suitable hardware description language (such as Verilog or VHDL), and transformed into a gate-level netlist (describing standard cells and the electrical connections between them), and after further phases the chip implementing the processor 212, memory 220 and the code 222 of the mobile apparatus 130, 140 may be fabricated with photo masks describing the circuitry.

In an example embodiment, the processor 212 and the memory 220 are separate entities, communicatively coupled together by an appropriate serial bus, for example. In general interfaces between the various elements may be implemented with suitable interface technologies, such as a message interface, a method interface, a sub-routine call interface, a block interface, an appropriate serial/parallel bus, or any hardware/software means enabling communication between various sub-units of the mobile apparatus 100.

An example embodiment provides a computer-readable medium 230 comprising a computer program comprising the computer program code 222 which, when loaded into the mobile apparatus 130, 140 causes the mobile apparatus 130, 140 to perform required operations relating to the magnetic positioning.

Naturally, the mobile apparatus 130, 140 may include various other parts, such as a battery, a camera, or a radio-frequency identifier reader, but as they are not needed to further illustrate the example embodiments, they will not be further described.

In an example embodiment, the communication network 180 comprises at least one wireless standard/non-standard/proprietary communication network, which is coupled with a wired network such as the Internet.

In an example embodiment, the wireless communication network 180 comprises any mobile phone network, regardless of the generation (such as 2G, 3G, 4G, beyond 4G, 5G etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), Mobile WiMAX, and other radio systems (in their present forms and/or in their evolution forms).

In an example embodiment, the communication network 180 supports the use of subscriber identity module (SIM), which may be an integrated circuit storing subscriber data, which is network-specific information used to authenticate and identify the subscriber on the cellular network. The subscriber+ identity module may be embedded into a removable SIM card. Consequently, the mobile apparatus 130, 140 may include the SIM card (and a SIM card reader). Alternatively, the mobile apparatus 130, 140 may include a virtual or software SIM card.

In an example embodiment, the wireless communication network 180 comprises a wireless local area network (WLAN), a hotspot, or an access point, all of which may provide Internet access through the use of a router connected to a link to an Internet service provider.

As illustrated in FIG. 1, the positioning management apparatus 100 comprises one or more processors 104 and one or more memories 106 including computer program code 108.

The processor 104 and the memory 106 may be implemented by electronic circuits.

The term 'processor' 104 refers to a device that is capable of processing data. Depending on the processing power needed, the positioning management apparatus 100 may comprise several processors 104 such as parallel processors or multicore processors. The term 'memory' 106 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

In an example embodiment, the processor 104 may be implemented as a microprocessor implementing functions of a central processing unit (CPU) on an integrated circuit. The CPU is a logic machine executing the computer program code 108. The computer program code 108 may be coded as a computer program using a programming language, which may be a high-level programming language, such as C, C++, or Java, or a low-level programming language, such as a machine language, or an assembler, for example. As illustrated in FIG. 2 (for the mobile apparatus 130, 140, but the structure may be similar, changing such things that need to be changed, for the positioning management apparatus 100), the CPU 104 may comprise a set of registers 214, an arithmetic logic unit (ALU) 216, and a control unit (CU) 218. The control unit 218 is controlled by a sequence of the computer program code 108 transferred to the CPU from the (working) memory 106. The control unit 218 may contain a number of microinstructions for basic operations. The implementation of the microinstructions may vary, depending on the CPU design. The microprocessor 104 may also have an operating system (a dedicated operating system of an embedded system, a real-time operating system, or even a general-purpose operating system), which may provide the computer program code 108 with system services.

An example embodiment provides a computer-readable medium 160 comprising a computer program comprising the computer program code 108 which, when loaded into the positioning management apparatus 100 causes the positioning management apparatus to perform the operations required to implement the functionality of the example embodiments.

The example embodiments of the positioning management apparatus 100 may be used to enhance the operation of the computer program code 108. There are many ways to structure the computer program code 108. In an example embodiment, the operations of the computer program code 108 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 108 for performing a wide variety of standard operations. In an example embodiment, the computer program code 108 may be in source code form, object code form, executable file, or in some intermediate form. The computer-readable medium 160 may comprise at least the following, any entity or device capable of carrying computer program code 108 to the positioning management apparatus 100, a record medium, a computer memory, a read-only memory, an electrical carrier signal, a telecommunications signal, and a software distribution medium. In some jurisdictions, depending on the legislation and the patent practice, the computer-readable medium 160 may not be the telecommunications signal. In an example embodiment, the computer-readable medium 160 may be a non-transitory computer-readable storage medium.

The one or more memories 106 and the computer program code 108 are configured to, with the one or more processors 104, cause the positioning management apparatus 100 at least to perform the following sequence of operations:

110) Receive 170 first reception information from the first mobile apparatus 130, the first reception information having been generated based on a received radio transmission 152 from the transmitting apparatus 150.

112) Receive 172 second reception information from the second mobile apparatus 140, the second reception information having been generated based on a received radio transmission 154 from the transmitting apparatus 150.

114 & 116) Compare the first reception information with the second reception information, and, if the comparison indicates that both the first mobile apparatus 130 and the second mobile apparatus 140 received the radio transmission 152, 154 from the same transmitting apparatus 150, determine an association of the first mobile apparatus 130 with the second mobile apparatus 140 for use in positioning.

In an example embodiment, for at least one of the first mobile apparatus 130 or the second mobile apparatus 140, the positioning management apparatus 100 is further caused to determine 174A, 174B its estimated location 190, 192 based on the association of the first mobile apparatus 130 with the second mobile apparatus 140.

The association of the first mobile apparatus 130 with the second mobile apparatus 140 indicates that they both occupy or occupied the same space, in a building or a part of the building, or that their routes crossed or passed each other, for example, which aids in determining the estimated location 190, 192.

In an example embodiment, the association indicates that the first mobile apparatus 130 and the second mobile apparatus 140 are or were within a radio range 156 of the same transmitting apparatus 150. This means that they occupy or occupied the same space, or at least that their routes adjoined each other. The radio range 156 depends on the nature and transmission power of the radio transmission 152, 154.

In an example embodiment, the positioning 120 may commence in co-operation 176A/176B with the first mobile apparatus 130 and/or the second mobile apparatus 140, whose positioning 120 was initialized with the estimated location 190/192.

In an example embodiment, instead of initialization, the estimated location 190, 192 is utilized in connection with an ongoing positioning 120, in order to improve the accuracy of the positioning 120, or in order to correct the result of the positioning 120, for example.

In an example embodiment, the estimated location 190, 192 is determined 312 based also on a magnetic positioning 120 of at least one of the first mobile apparatus 130 or the second mobile apparatus 140.

In an example embodiment, the estimated location is determined based on the association of the first mobile apparatus 130 with the second mobile apparatus 140 so that a location probability of the first mobile apparatus 130 and a location probability of the second mobile apparatus 140 are processed in order to determine the estimated location 190,192.

In an example embodiment, a location of the transmitting apparatus 150 is not known by the positioning management apparatus 100 before the determination of the estimated location 190, 192. This means that it is not necessary to know the location of the transmitting apparatus 150 in order to utilize the association of the first mobile apparatus 130 with the second mobile apparatus 140 in determining the estimated location 190,192.

In an example embodiment, triangulation technology may be used to determine an estimated location 198 for the transmitting apparatus 150: the positioning management apparatus 100 may triangulate the estimated location 198 (with reception power information obtained from two or more receiving mobile apparatuses 130, 140, for example).

In an example embodiment, an estimated location 198 of the transmitting apparatus 150, identified by an identifier in its radio transmission 152, 154, is determined based on at least one of the estimated location 190 of the first mobile apparatus 130, the estimated location 192 of the second mobile apparatus 140, the association of the first mobile apparatus 130 with the second mobile apparatus 140, and the estimated location 198 of the transmitting apparatus 150 is stored in the memory, and the estimated location 198 of the transmitting apparatus 150 is utilized in subsequent determinations of estimated locations for mobile apparatuses so that as the mobile apparatuses receive the radio transmission with the identifier from the transmitting apparatus 150, the estimated location 198 of the transmitting apparatus 150 is fetched from the memory based on the identifier.

In an example embodiment, the non-cellular radio transceiver 204 of the mobile apparatus 130, 140 may be utilized to receive the radio transmission 152, 154 from the transmitting apparatus 150.

In an example embodiment, the cellular radio transceiver 206 of the mobile apparatus 130, 140 may be utilized to receive the radio transmission 152, 154 from the transmitting apparatus 150.

In an example embodiment, the received radio transmission 152, 154 comprises a specific radio signal. The received radio transmission 152, 154 may include one or more radio frames or data packets, or other data structures. The received radio transmission 152, 154 may be transmitted periodically, a predetermined number of times, or for a predetermined time period, for example.

Figure 3:
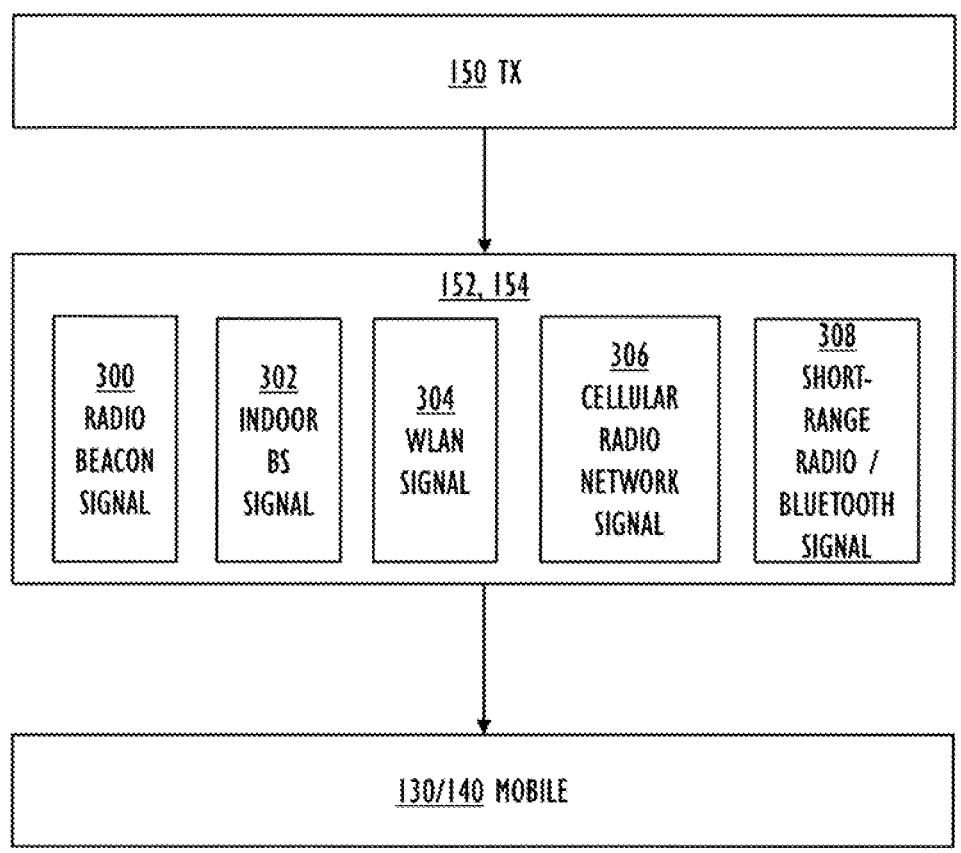
FIG. 3 illustrates example embodiments of a radio transmission.

FIG. 3 illustrates various example embodiments of the radio transmission 152, 154.

In an example embodiment, the received radio transmission 152, 154 comprises a radio beacon signal 300.

In an example embodiment, the radio transmission 152, 154 is implemented with Apple® iBeacon® technology utilizing low-powered transmitters (such as Bluetooth® Low Energy BLE or Bluetooth® Smart transmitters). The iBeacon frame 300 may include a variable UUID (Universally Unique Identifier), which may be used transmit the identifier of the transmitting apparatus 150.

In an example embodiment, the received radio transmission 152,154 comprises an indoor base station signal 302.

In an example embodiment, the received radio transmission 152, 154 comprises a wireless local area network (WLAN) signal 304 (such as Wi-Fi or IEEE 802.11 series, for example).

In an example embodiment, the received radio transmission 152, 154 comprises a cellular radio network signal 306 (such as the wireless communication network 180).

In an example embodiment, the received radio transmission 152, 154 comprises at least one of a short-range radio signal or a Bluetooth® radio signal 308.

Figure 4:
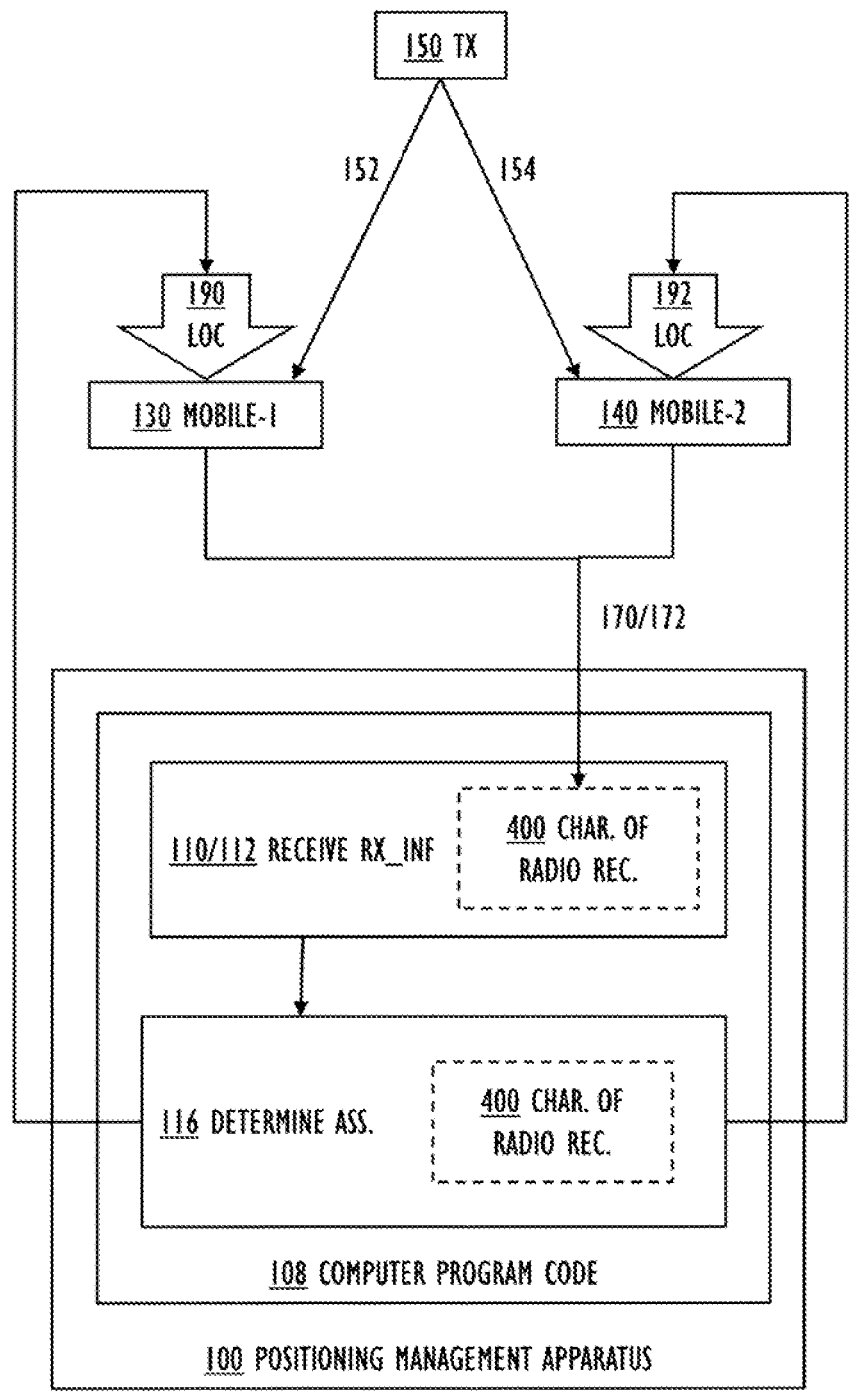
FIGS. 4 and 5 illustrate further example embodiments of the positioning management apparatus.

In an example embodiment illustrated in FIG. 4, the reception information 170, 172 further includes information 400 on characteristics of radio reception of the radio transmission 152, 154, and, in order to determine the estimated location 190, 192 the characteristics 400 of the radio reception of the radio transmission 152, 154 are taken into account. For example: received signal strength of the radio transmission 152, 154 may give a rough or even a relatively precise estimate of the distance between the transmitting apparatus 150 and the first mobile apparatus 130, and/or of the distance between the transmitting apparatus 150 and the second mobile apparatus 140, and, in order to determine the estimated location 190, 192 the estimated distance is taken into account. For example, in iBeacon® technology, the mobile apparatus 130,140 receiving the radio transmission 152, 154 may approximate the distance into three ranges: immediate (within a few centimeters), near (within a couple of meters), and far (greater than ten meters away). As the standard iBeacon® range is 70 meters (with a maximum of 450 meters), the estimated location 190, 192 is precise enough for initialization of the magnetic positioning 120. The iBeacon® frame may include a TX Power field representing the transmitting device's signal reference intensity a meter away from it. The receiving mobile apparatus 130, 140 determines the intensity of the received signal and compares the reference value received in the TX Power to the intensity of the received signal in order to compute an estimation of the distance.

In an example embodiment illustrated in FIG. 1, the positioning management apparatus 100 is caused to obtain a probabilistic location 194/196 for one of the first mobile apparatus 130 or the second mobile apparatus 140, whose indoor location is known, and for one of the first mobile apparatus 130 or the second mobile apparatus 140, whose indoor location is not known, to determine its estimated location 190/192 based also on the probabilistic location 194/196. Note that "known" here refers to the fact that the indoor location has been determined with an accuracy that may vary: the known indoor location may be very accurate, within an error margin of a few meters, or less accurate, such as being specific to a certain area (possibly having some radius like 100 meters or less or more, for example).

In essence, the separate location probabilities, when combined, produce an improved estimation of the location 190, 192 as compared to the singular, isolated location probabilities. An example scenario: Let us assume that the location 194 of the first mobile apparatus 130 (and/or the location 196 of the second mobile apparatus 140) is known with some probability. Now, the second mobile apparatus 140 starts positioning (or continues the positioning), records sensor data, and at time t receives the radio signal 154 from the transmitting apparatus 150. The information that the second mobile apparatus 140 is or has been at the radio range 156 from the transmitting apparatus 130, is utilized to improve the estimated location 192 of the second mobile apparatus 140 (and/or the estimated location 190 of the first mobile apparatus 130). One example implementation embodiment is to combine this cue, the other sensor measurements and all available map information using a particle filter. The particle filter may be operated as the user moves (with the mobile apparatus 130/140) inside a building.

Another example embodiment uses a two-pass bidirectional particle filter to process the location probabilities.

In an example embodiment, if the indoor location 194 of the first mobile apparatus 130 is known, the indoor location 192 of the second mobile apparatus 140 may be estimated, or, alternatively, if the indoor location 196 of the second mobile apparatus 140 is known, the indoor location 190 of the first mobile apparatus 130 may be estimated.

In an example embodiment illustrated in FIG. 1, in order to determine the estimated location 190/192, a probabilistic location 196/194 is set as the estimated location 190/192. Even though the locations of the first mobile apparatus 130 and the second mobile apparatus 140 were in reality not the same, the estimated location is precise enough so that the magnetic positioning 120 may then pinpoint the precise location fast.

The described processing implements a co-operative positioning. The association of the first mobile apparatus 130 with the second mobile apparatus 140 makes it possible to utilize the positioning information obtained by both apparatuses 130, 140 in order to generate the estimated location 190, 192 for one or both of the apparatuses 130, 140. In an example embodiment, the probabilistic location 194/196 of one mobile apparatus may be utilized to determine the estimated location 190/192 for another apparatus, whereupon the magnetic positioning of the other mobile apparatus may be initialized with the estimated location 190/192, which may save system resources and make the operation faster (first fix time is shortened) and more robust. Alternatively, or additionally, the estimated location 190, 192 may be utilized to correct or improve an already ongoing magnetic positioning 120.

Figure 5:
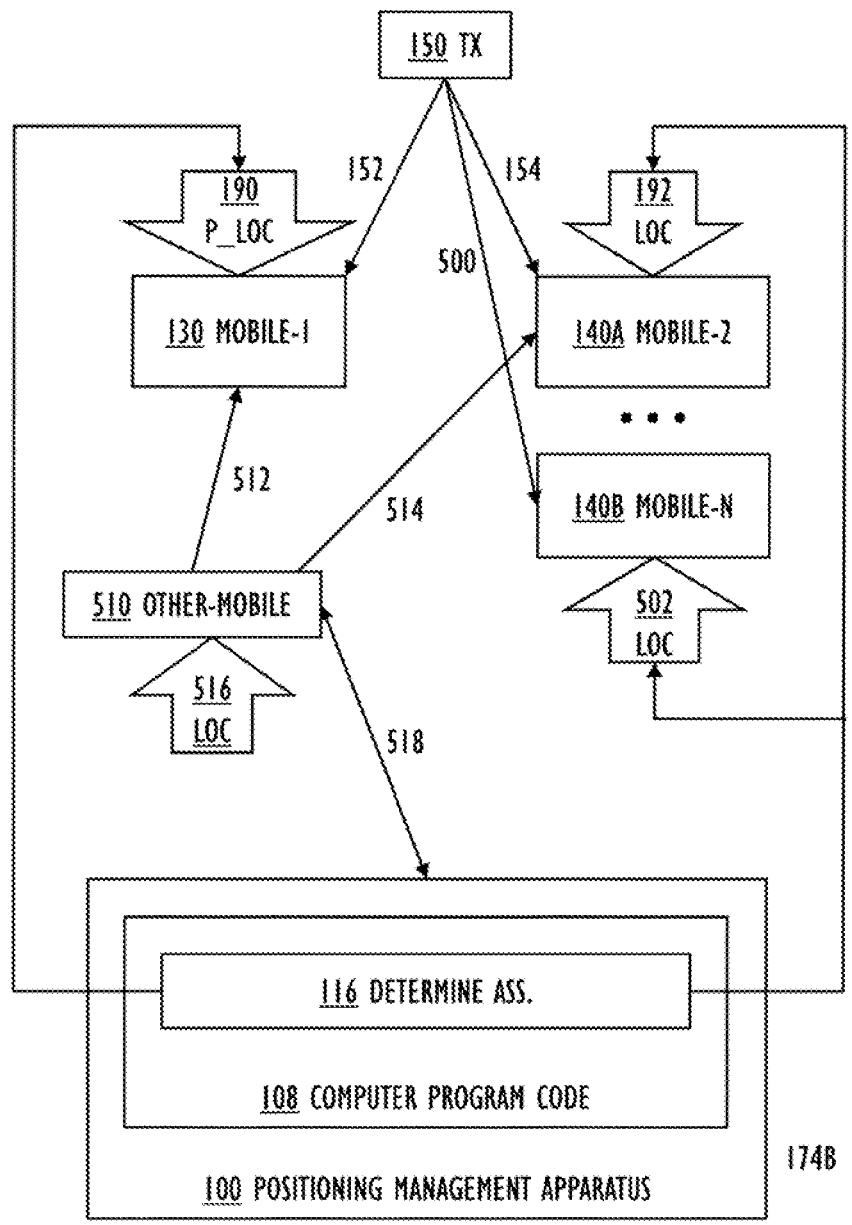

In a further example embodiment of FIG. 5, the radio transmission 152, 154, 500 from the transmitting apparatus 150 is received by the first mobile apparatus 130 and a plurality of the second mobile apparatuses 140A, 140B, and a plurality of the estimated locations 190, 192, 502 are determined for first mobile apparatus 130 and the plurality of the second mobile apparatuses 140A, 140B, and the plurality of the magnetic positionings 120 of the first mobile apparatus 130 and the plurality of the second mobile apparatuses 140A, 140B are supplemented with the plurality of the estimated locations 190, 192, 502. The number of the second mobile apparatuses 140A, 140B may vary from 1 to N, wherein N is any integer greater than one. In this way, location configurations of many mobile apparatuses 140A, 140B may be found out simultaneously.

Furthermore, the location configurations may be complex structures. In an example embodiment, for the determination of the estimated location, co-operation information is taken into account, the co-operation information comprising at least one of data relating to another mobile apparatus 510 communicating 512 with the first mobile apparatus 130, data relating to another mobile apparatus 510 communicating 512 with the second mobile apparatus 140A. In an example embodiment, explained in more detail in the co-pending application Ser. No. 14/859,985, the other mobile apparatus 510 may transmit a radio beacon 512, 514 with an identifier, which is then received by the first mobile apparatus 130 and/or by the second mobile apparatus 140A, and this reception is reported by the mobile apparatuses 130, 140A to the positioning management apparatus 100 in order to generate the co-operation Information. The other mobile apparatus 510 may also communicate 518 with the positioning management apparatus 100. A location 516 of the other mobile apparatus 510 may be known, in which case the location 516 is used in determining the locations 190, 192, 602, or if the location 516 is not known, the location 516 may be determined based on the location 190, 192, 502.

With this example embodiment, a plurality of mobile apparatuses 130, 140A, 140B, 510, which are within radio ranges of each other, may better locate themselves in a co-operative fashion. In a way, the locations of the mobile apparatuses 130, 140A, 140B, 510 form a mesh on a map, and as the information is combined, the location configuration of all apparatuses 130, 140A, 140B, 510 may be determined.

Figure 6:
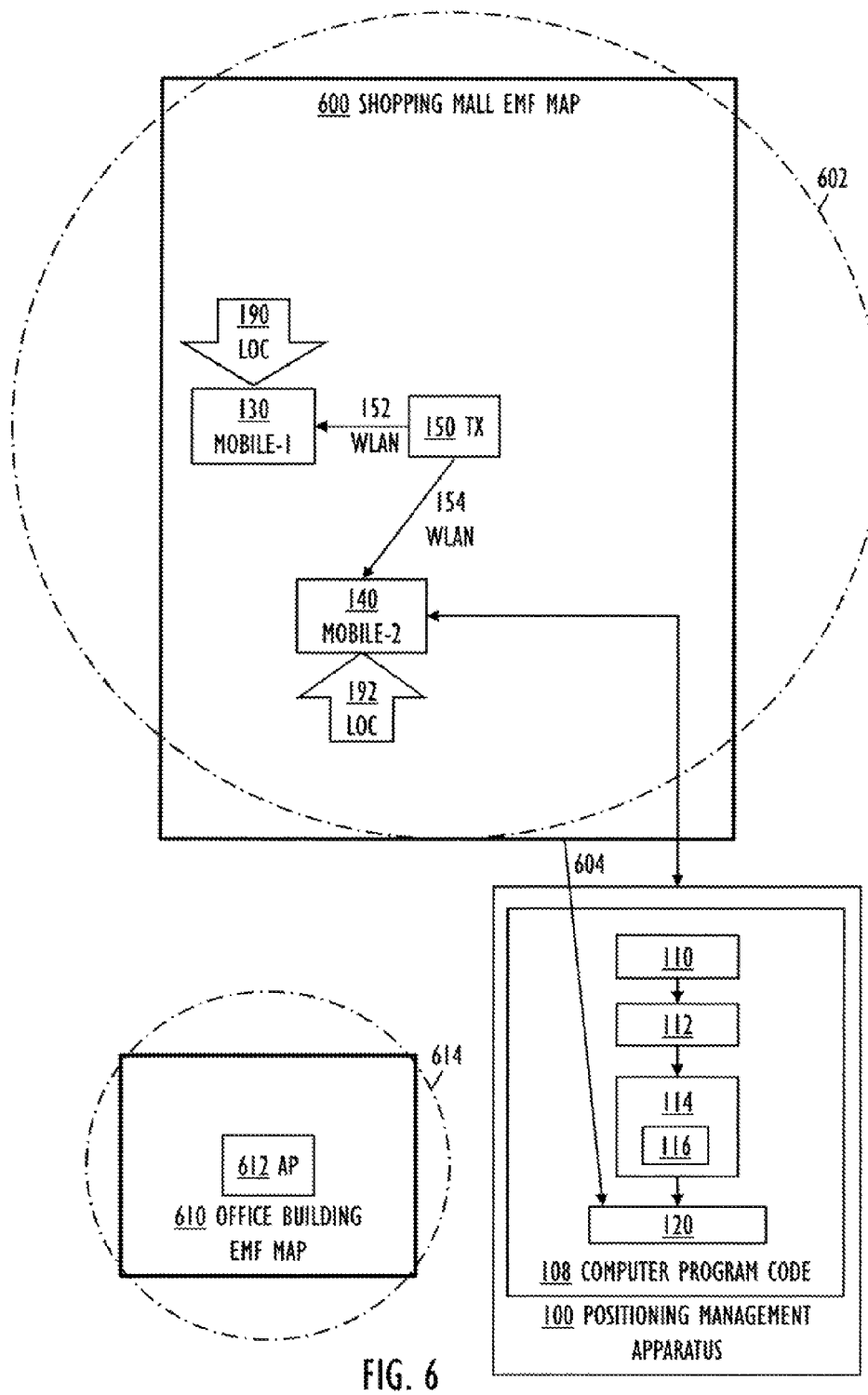
FIGS. 6, 7 and 8 illustrate example embodiments of an Earth's magnetic field EMF map.
Figure 7:
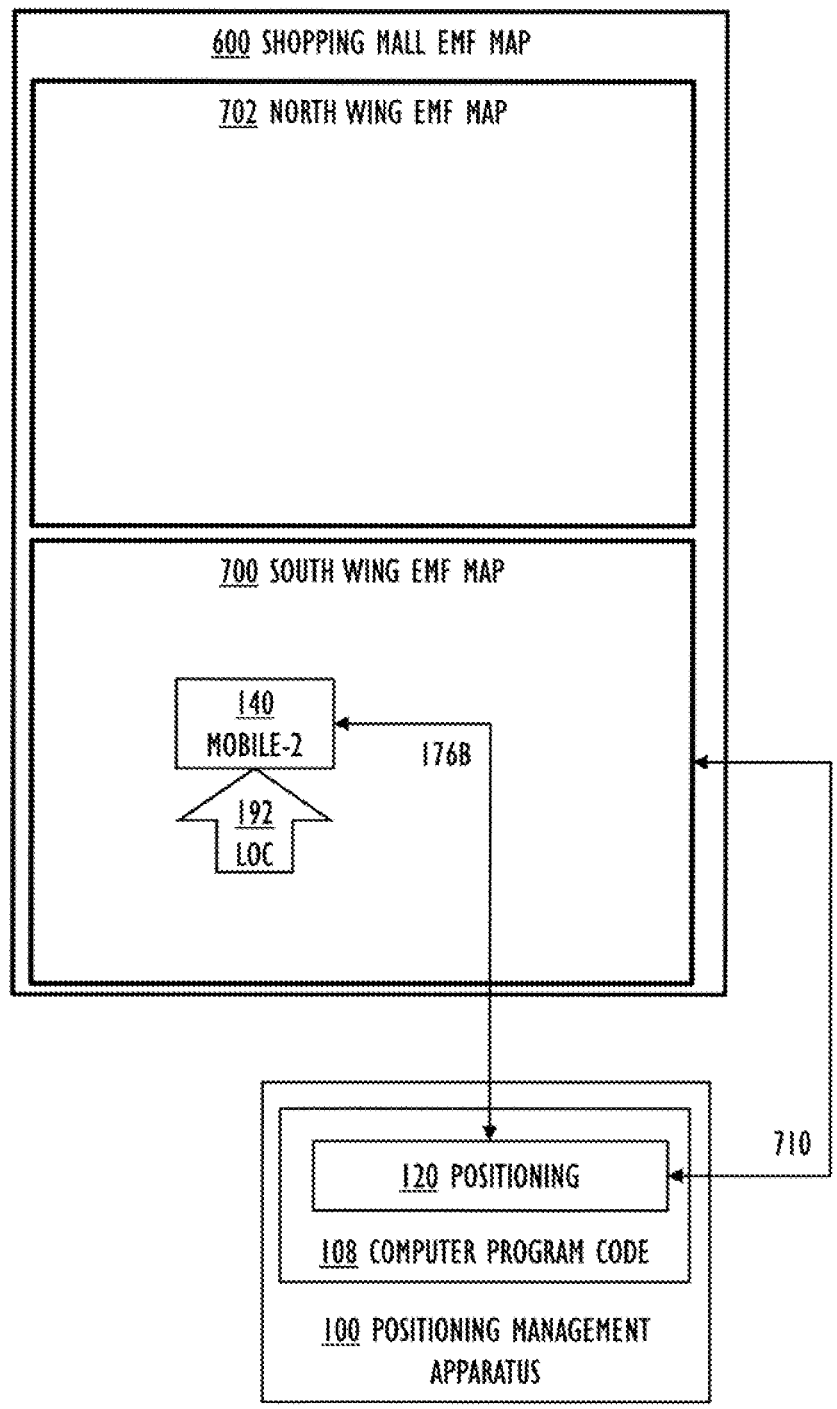
Figure 8:
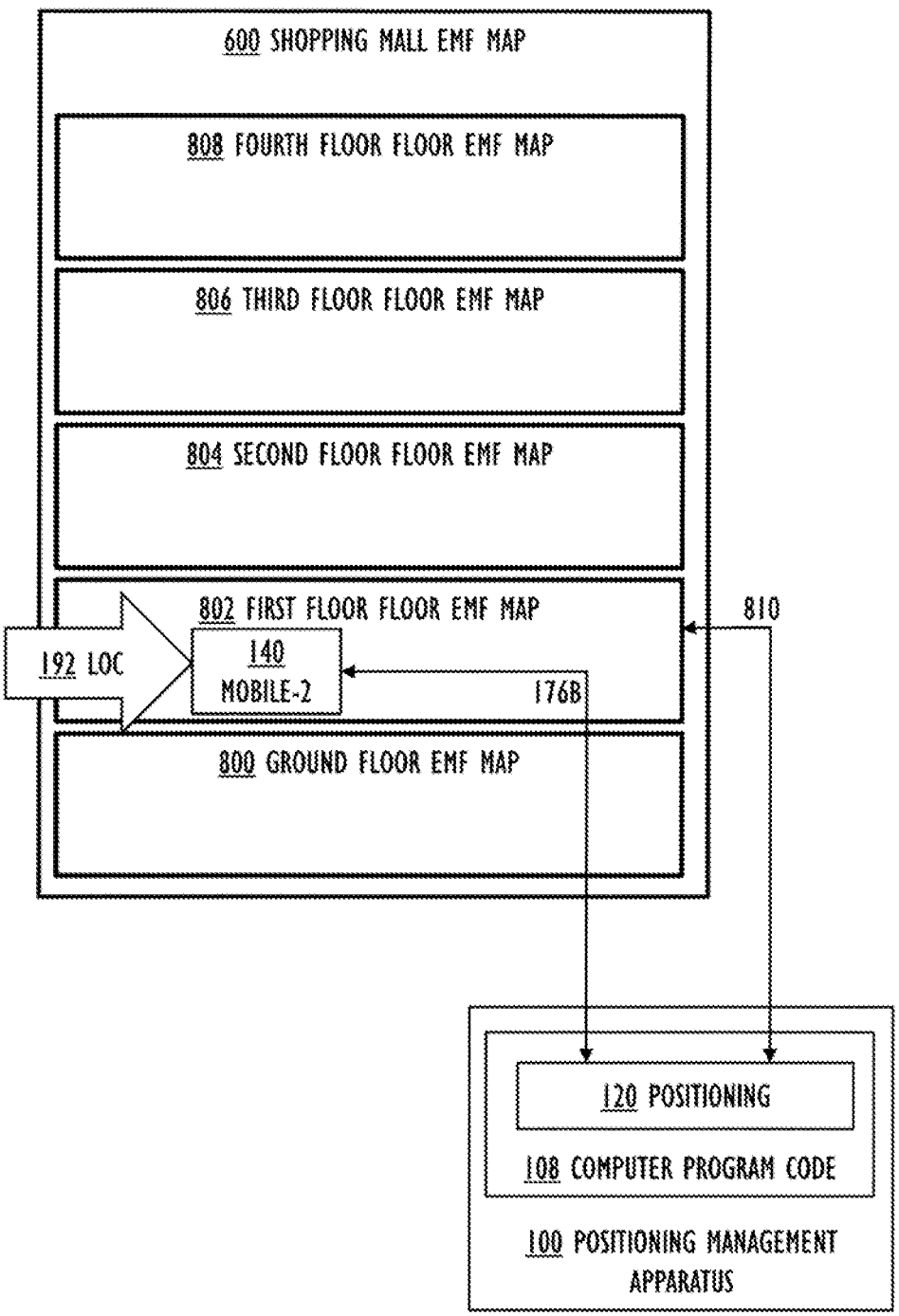

Let us next study FIGS. 6, 7 and 8, which illustrate further example embodiments of the positioning management apparatus 100, especially in view of using an Earth's magnetic field EMF map of a building by the positioning 120.

In an example embodiment, the positioning comprises an indoor magnetic positioning, and, consequently, the determination generates an estimated indoor location 190, 192, possibly based on a probabilistic indoor location 194, 196. It is to be noted that the magnetic positioning functions inside a building, but also between buildings and near a building. This is due to the fact that the building structures cause variations to the magnetic field of the Earth.

In the magnetic positioning of the mobile apparatus 130, 140, each EMF vector measured by the mobile apparatus 130, 140 carried by a person may be compared to existing information, wherein the information may comprise EMF vector strength and direction in several locations within a building or within a plurality of buildings. The information may thus depict an Indoor Earth's magnetic field map. As implied by the word "map", the EMF map comprises location specific data: each location in the map is associated with a certain EMF value (magnitude and/or direction), for example. As the amount of data in the EMF map, typically covering many buildings, may be large, the EMF map may be stored in the positioning management apparatus 100 instead of the mobile apparatus 130, 140 having limited computational capabilities. The mobile apparatus 130, 140 may thus transmit EMF measurement results to the positioning management apparatus 100, which performs the comparison against the EMF map. As a result, the positioning management apparatus 100 may then return a location estimate to the mobile apparatus 130, 140. In another example embodiment, the database storing the EMF map, or at least part of the EMF map, is in the mobile apparatus 130, 140. In an example embodiment, the EMF map may be utilized in determining the estimated location 190, 192 as the radio range 156 may be used to determine which locations are possible. Especially, if the probabilistic location 194, 196 is known, the radio range 156 may help in determining possible locations on the map.

FIG. 6 illustrates an example embodiment, wherein the EMF map for the building is chosen 604 from among a plurality of EMF maps 600, 610 for a plurality of buildings for use by the magnetic positioning 120 based on the estimated location 190, 192. In our example embodiment, we have two buildings, a shopping mall and an office building, and their EMF maps 600, 610. Each building is serviced by an access point 150, 612 implementing a radio cell 602, 614. The users of the first and second mobile apparatus 130, 140 have walked into the shopping mall. The mobile apparatuses 130, 140 have received WLAN signal 152, 154 from the access point (=transmitting apparatus) 150. The positioning management apparatus 100 determines that the locations 190, 192 are within the shopping mall (and not within the office building, for example). The EMF map 600 for the building (=shopping mall) is chosen 604 for use by the magnetic positionings 120 of the mobile apparatuses 130, 140.

FIGS. 7 and 8 illustrate an example embodiment, wherein a part 700, 802 of the EMF map 600 of the building is chosen 710, 810 for use by the positioning 120 based on the estimated location 192. In FIG. 7, two adjacent EMF maps exist: a map 700 for the south wing and a map 702 for the north wing of the building. In FIG. 8, the adjacent maps 800, 802, 804, 806, 808 are for different floors of the building.

In an example embodiment, for the determination of the estimated location 190, 192, history information is taken into account. The history information comprises at least one of a past sensor event of the first mobile apparatus 130, a past location of the first mobile apparatus 130, a past sensor event of the second mobile apparatus 140, a past location of the second mobile apparatus. With this example embodiment, the determination of the estimated location 190, 192 may also utilize the history information. The past locations may be time-stamped, and if it supposed that the user can move with a certain speed, it may be estimated where the current location can be. Also, past sensor events may indicate important information: an inertial sensor (such as an acceleration sensor and/or a gyroscope), for example, may produce information from which a covered distance by the user may be estimated, based on an inertial navigation, step detection, stride information, or PDR (pedestrian dead reckoning), for example. The association of the first mobile apparatus 130 with the second mobile apparatus 140 indicates that they may both be or have been in the same space, in a building or a part of the building, for example, or that their routes have crossed or been near to each other, which may aid in analyzing the history information in order to estimate the location configuration 190, 192 for at least one of the mobile apparatuses 130, 140.

In an example embodiment, for the determination of the estimated location 190, 192, reliability information is taken into account. The reliability information comprises at least one of a reliability of the first mobile apparatus 130, a reliability of the second mobile apparatus 140. The reliability information may relate to the quality of the sensors present in the mobile apparatus 130, 140 and/or to the quality of the location probabilities (probability distributions, for example): the better the quality, the more reliable the information and, conversely, the worse the quality, the less reliable the information.

Figure 9:
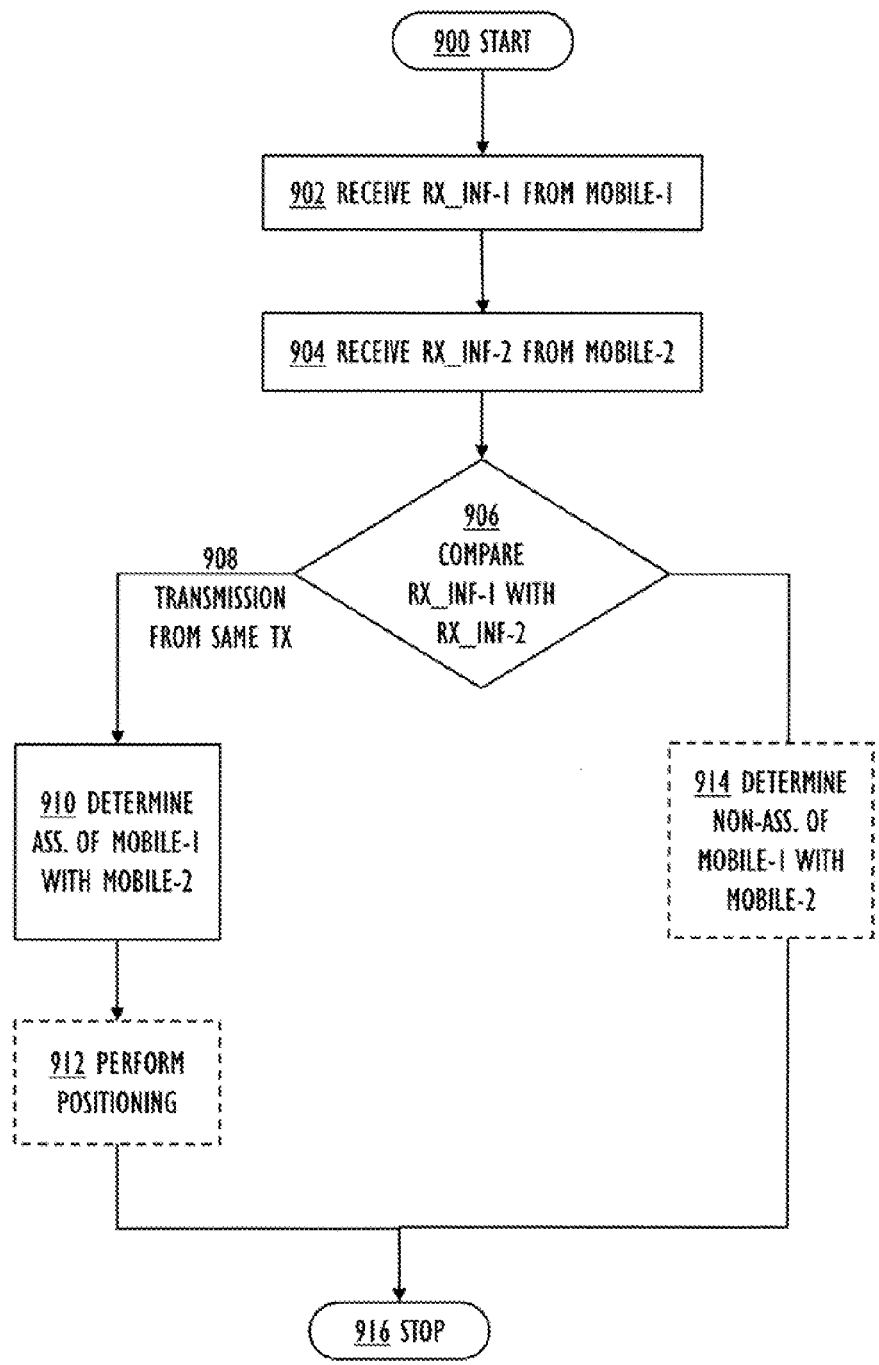
FIG. 9 is a flow chart illustrating example embodiments of a method.

Next, let us study FIG. 9 illustrating a method performed in the positioning management apparatus 100. The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 900.

In 902, first reception information is received from a first mobile apparatus, the first reception information having been generated based on a received radio transmission from a transmitting apparatus.

In 904, second reception information is received from a second mobile apparatus, the second reception information having been generated based on a received radio transmission from a transmitting apparatus.

In 906, the first reception information is compared with the second reception information. If the comparison 906 indicates 908 that both the first mobile apparatus and the second mobile apparatus received the radio transmission from the same transmitting apparatus, an association of the first mobile apparatus with the second mobile apparatus is determined for use in positioning.

Optionally, in 912, the positioning is performed for at least one of the first mobile apparatus or the second mobile apparatus.

Optionally, in 914, if the comparison indicates that both the first mobile apparatus and the second mobile apparatus did not receive the radio transmission from the same transmitting apparatus, a non-association of the first mobile apparatus with the second mobile apparatus is determined for use in positioning. The non-association of the first mobile apparatus with the second mobile apparatus indicates that they both do not or did not occupy the same space, in a building or a part of the building, or that their routes did not cross or pass each other, for example, which aids in determining the estimated location.

The method ends in 916.

The already described example embodiments of the positioning management apparatus 100 may be utilized to enhance the method with various further example embodiments. For example, various structural and/or operational details may supplement the method.

It will be obvious to a person skilled in the art that, as technology advances, the inventive concept can be implemented in various ways. The invention and its embodiments are not limited to the example embodiments described above but may vary within the scope of the claims.

The invention claimed is:

1. A positioning management apparatus comprising:
one or more processors; and
one or more memories including computer program code, the one or more memories and the computer program code configured to, with the one or more processors, cause the positioning management apparatus at least to:
receive first reception information from a first mobile apparatus, the first reception Information having been generated based on a received radio transmission from a transmitting apparatus;
receive second reception information from a second mobile apparatus, the second reception information having been generated based on a received radio transmission from a transmitting apparatus; and
compare the first reception information with the second reception information, and, if the comparison indicates that both the first mobile apparatus and the second mobile apparatus received the radio transmission from the same transmitting apparatus, determine an association of the first mobile apparatus with the second mobile apparatus for use in positioning.

2. The positioning management apparatus of claim 1, wherein the received radio transmission comprises a radio beacon signal.

3. The positioning management apparatus of claim 1, wherein the received radio transmission comprises an indoor base station signal.

4. The positioning management apparatus of claim 1, wherein the received radio transmission comprises a wireless local area network signal.

5. The positioning management apparatus of claim 1, wherein the received radio transmission comprises a cellular radio network signal.

6. The positioning management apparatus of claim 1, wherein the received radio transmission comprises at least one of a short-range radio signal, or a Bluetooth radio signal.

7. The positioning management apparatus of claim 1, wherein, for at least one of the first mobile apparatus or the second mobile apparatus, the positioning management apparatus is further caused to determine its estimated location based on the association of the first mobile apparatus with the second mobile apparatus.

8. The positioning management apparatus of claim 7, wherein the estimated location is determined based also on a magnetic positioning of at least one of the first mobile apparatus or the second mobile apparatus.

9. The positioning management apparatus of claim 7, wherein the reception information further includes information on characteristics of radio reception of the radio transmission, and, in order to determine the estimated location, the characteristics of the radio reception of the radio transmission are taken into account.

10. The positioning management apparatus of claim 7, wherein a probabilistic location is obtained for one of the first mobile apparatus or the second mobile apparatus, whose indoor location is known, and for one of the first mobile apparatus or the second mobile apparatus, whose indoor location is not known, its estimated location is determined based also on the probabilistic location.

11. The positioning management apparatus of claim 7, wherein an Earth's magnetic field EMF map of a building is used by the positioning, and at least one of the following is performed:
the EMF map for the building is chosen from among a plurality of EMF maps for a plurality of buildings for use by the magnetic positioning based on the estimated location;
a part of the EMF map of the building is chosen for use by the magnetic positioning based on the estimated location.

12. The positioning management apparatus of claim 7, wherein, for the determination of the estimated location, history information is taken into account, the history information comprising at least one of a past sensor event of the first mobile apparatus, a past location of the first mobile apparatus, a past sensor event of the second mobile apparatus, a past location of the second mobile apparatus.

13. The positioning management apparatus of claim 7, wherein, for the determination of the estimated location, reliability information is taken into account, the reliability information comprising at least one of a reliability of the first mobile apparatus, a reliability of the second mobile apparatus.

14. The positioning management apparatus of claim 7, wherein, for the determination of the estimated location, co-operation information is taken into account, the co-operation information comprising at least one of data relating to another mobile apparatus communicating with the first mobile apparatus, data relating to another mobile apparatus communicating with the second mobile apparatus.

15. The positioning management apparatus of claim 7, wherein the estimated location is determined based on the association of the first mobile apparatus with the second mobile apparatus so that a location probability of the first mobile apparatus and a location probability of the second mobile apparatus are processed in order to determine the estimated location.

16. The positioning management apparatus of claim 7, wherein a location of the transmitting apparatus is not known by the positioning management apparatus before the determination of the estimated location.

17. The positioning management apparatus of claim 7, wherein
an estimated location of the transmitting apparatus, identified by an identifier in its radio transmission, is determined based on at least one of the estimated location of the first mobile apparatus, the estimated location of the second mobile apparatus, the association of the first mobile apparatus with the second mobile apparatus, and the estimated location of the transmitting apparatus is stored in the memory; and
the estimated location of the transmitting apparatus is utilized in subsequent determinations of estimated locations for mobile apparatuses so that as the mobile apparatuses receive the radio transmission with the identifier from the transmitting apparatus, the estimated location of the transmitting apparatus is fetched from the memory based on the identifier.

18. The positioning management apparatus of claim 1, wherein the positioning management apparatus is further caused, if the comparison indicates that both the first mobile apparatus and the second mobile apparatus did not receive the radio transmission from the same transmitting apparatus, determine a non-association of the first mobile apparatus with the second mobile apparatus for use in positioning.

19. A non-transitory computer-readable storage medium comprising a computer program comprising computer program code which, when loaded into a positioning management apparatus causes the positioning management apparatus at least to:
receive first reception information from a first mobile apparatus, the first reception information having been generated based on a received radio transmission from a transmitting apparatus;
receive second reception information from a second mobile apparatus, the second reception information having been generated based on a received radio transmission from a transmitting apparatus; and
compare the first reception information with the second reception information, and, if the comparison indicates that both the first mobile apparatus and the second mobile apparatus received the radio transmission from the same transmitting apparatus, determine an association of the first mobile apparatus with the second mobile apparatus for use in positioning.

20. A method in a positioning management apparatus comprising:
receiving first reception information from a first mobile apparatus, the first reception information having been generated based on a received radio transmission from a transmitting apparatus;
receiving second reception information from a second mobile apparatus, the second reception information having been generated based on a received radio transmission from a transmitting apparatus; and
comparing the first reception information with the second reception information, and, if the comparison indicates that both the first mobile apparatus and the second mobile apparatus received the radio transmission from the same transmitting apparatus, determining an association of the first mobile apparatus with the second mobile apparatus for use in positioning.

* * * * *